_United States Patent Office_

3,754,023
Patented Aug. 21, 1973

3,754,023
β-4-n-PENTYLOXYBENZOYL-β-
BROMOACRYLIC ACID
Miroslav Semonsky, Viktor Zikan, and Vaclav Jelinek, Prague, Czechoslovakia, assignors to Spofa United Pharmaceutical Works, Prague, Czechoslovakia
No Drawing. Original application Feb. 16, 1968, Ser. No. 705,927. Divided and this application Aug. 5, 1970, Ser. No. 61,485
Claims priority, application Czechoslovakia, June 17, 1967, 1,173/67
Intc. Cl. C07c 65/20
U.S. Cl. 260—521 A          1 Claim

ABSTRACT OF THE DISCLOSURE

A compound of the formula

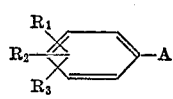
(I)

wherein $R_1$ is hydrogen, or alkoxy having from 1 to 6 carbon atoms, $R_2$ is hydrogen, or hydroxy or alkoxy having from 1 to 6 carbon atoms, and $R_3$ is alkoxy having from 1 to 6 carbon atoms, with the proviso that when $R_1$ and $R_2$ are both hydrogen, $R_3$ is alkoxy having from 2 to 6 carbon atoms, and wherein A is

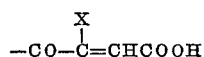

and X in the last residue being chlorine or bromine having cytostatic activity.

An example of the product is β-4-n-pentyloxybenzoyl-β-bromoacrylic acid.

CROSS REFERENCES TO RELATED APPLICATIONS

This application is a division of application Ser. No. 705,927 filed on Feb. 16, 1968, now abandoned, in respect of Crotonic Acid Lactones and Hydrolysis Products Thereof and Method of Making the Same.

BACKGROUND OF THE INVENTION

γ-4-methoxyphenyl-α,β-dichloro-Δ$^{α,β}$-crotonic acid lactone has already been described previously, and the same applies to the corresponding dibromo-compound; U.S. Pat. No. 3,105,850. Likewise, β-4-methoxybenzoyl-β-bromoacrylic acid and the corresponding chloroacrylic acid have become known in connection with a study of the possible cytostatic compounds. However, the one compound, β-4-methoxybenzoyl-β-bromoacrylic acid, which has been used in medical practice on a limited scale, can only be administered parenterally in the form of its sodium salt. Besides, it appeared desirable to improve the toxicity rating and the process of making the compounds of this general group.

In addition, better and more significant results regarding the cytostatic action in connection with a broad variety of tumors appeared highly desirable.

The previously known methoxybenzoyl compounds also presented problems of synthetic formation. To obtain the lactone, anisole was reacted with β-formyl-α,β-dichloroacrylic acid (mucochloric acid) in the presence of a reagent such as polyphosphoric acid. This process required a comparatively large amount of this acid, which is not earily made, and therefore resulted in a rather large volume of reaction mixture and a relatively poor yield and limited reproducibility. There was also the risk of decomposition both of the starting compound and the reaction product. In addition, certain derivatives could not be formed at all with polyphosphoric acid, as, for instance, the γ-4-hydroxy-2-methoxyphenyl-α,β-dibromocrotonic acid lactone.

Other problems existed in the hydrolysis of the lactone to the acid, for which previously magnesium oxide or calcium carbonate had been suggested together with a water-miscible solvent such as dioxane (see U.S. Pat. No. 3,105,850). The use of these salts, such as the magnesium salt, affects the stability of the materials during the course of the reaction and thus affects also the yield and the purity of the compounds obtained.

SUMMARY OF THE INVENTION

It is therefore an object of the present invention to provide novel cytostatic compounds which have an increased and broad species cytostatic action.

It is a further object of the invention to provide such compounds which can be administered orally and have a low acute and chronic toxicity.

It is a still further object of the invention to provide improved processes for condensing the mucohalogenoacid to the lactone and converting the latter by further processing to a aroyl-substituted halogenoacrylic acid. It is in particular an object of the invention in this connection to provide processes in both instances which avoid decomposition of the starting products or the final reaction products and result in improved yields and purity and have a high reproducibility.

These objects are met by a compound of the formula

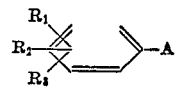
(I)

wherein $R_1$ is hydrogen, or alkoxy having from 1 to 6 carbon atoms, $R_2$ is hydrogen, or hydroxy or alkoxy having from 1 to 6 carbon atoms, and $R_3$ is alkoxy having from 1 to 6 carbon atoms, with the proviso that when $R_1$ and $R_2$ are both hydrogen, $R_3$ is alkoxy having from 2 to 6 carbon atoms, and wherein A is

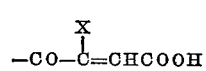

X in the last residue being chlorine or bromine.

An example of a lactone is γ-4-n-butoxyphenyl-α,β-dibromo-Δ$^{α,β}$-crotonic acid lactone. An example of the hydrolysis product is β-4-n-pentyloxybenzoyl-β-bromoacrylic acid.

The lactone-type compound is formed by condensing a mucohalo acid of the formula

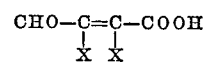
(II)

wherein X is bromine or chlorine, in the presence of substantially anhydrous zinc chloride or a mixture of anhydrous zinc chloride with phosphorus pentoxide, preferably at a temperature between 60 and 85° C.

The halogenoacrylic acid which is the hydrolysis product of the lactone may be formed by subjecting the lactone to a reaction with water and an organic water-miscible solvent in the presence of zinc oxide and at the boiling temperature of the reaction mixture.

DESCRIPTION OF THE PREFERRED EMBODIMENTS (I) The lactones

The crotonic acid lactones of the invention have been submitted to broad selection tests regarding their antineoplastic action on different transplantable tumors in the case of oral administration. More detailed tests were then carried out, as follows, with γ-4-n-butoxyphenyl-α,β- dibromo-Δ$^{α,β}$-crotonic acid lactone. These tests showed the following results:

Acute toxicity: It was determined that the $LD_{50}$ in mice was 16 g./kg. of body weight in the case of oral administration. This compared with 320 mg./kg. in the case of the β-4-methoxybenzoyl-β-bromoacrylic acid of the prior art (Pat. No. 3,105,850).

Chronic toxicity: The chronic toxicity was determined by tests with groups of 10 males and 10 females each on rats of the Wistar species over a period of 3 months. During this period, the animals were given doses of 50, 100 and 200 mg./kg. in the different groups, per day, and by oral administration in the form of suspension in water. From the histological, biochemical and hematological investigation or determination it was found that the dose of 50 mg./kg. daily per os did not result in any undesirable side effects nor in any effect on the food intake, the growth, or the blood composition. There was in particular no macroscopic or microscopic injury detectable to the inner organs (liver, spleen and kidneys) and no action on the activity of the glutamate-pyruvate-transaminase or of the residual nitrogen or the blood proteins.

The higher dosis (100 and 200 mg./kg. daily per os) resulted in a moderate microscopically detectable liver and spleen injury when administered under the same conditions, and in the case of females caused a slight effect on the blood proteins in the direction of hyperproteinemia.

High cytostatic action of the butoxyphenyl-substituted crotone lactone defined above was found to exist in the case of certain transplantable tumors, not only in the form of an inhibition of the tumor growth, but primarily in the form of a significant prolongation of the survival time of the treated animals. To specifically determine these actions, the following seven types of transplantable tumors were implanted in the animals and subjected to the investigation:

S 180—Crocker-sarcoma
HK—adenocarcinoma of the mammary gland
ATE—Ehrlich-ascitescarcinoma
S 37—ascites-sarcoma
Kr 2—cancerous-ascites-sarcoma
$6C_3HED$—Gardner-lymphosarcoma
Y—Yoshida-ascitessarcoma in rats The administration to the animals was effected, in the case of firm (solid) tumors (S 180 and HK), beginning with the third day after the transplantation and for a period of 12 days, once daily. In the case of ascites tumors (ATE, S 37, Kr 2, $6C_3HED$, and Y), the administration was effected once daily for 5 days, starting with the second day after the transplantation. After completion of the administration, the weight of the prepared tumors was ascertained in a first test group of 10 animals. In another test group of 10 animals, the survival time of the animals was noted.

In the second test groups involving ascites tumors $6C_3HED$ and Y, only the survival time in a 10-animal group was noted. The average size of the tumors and the average survival time were then compared with the average values obtained in a parallel group of untreated animals. The differences were statistically calculated by the $t$-Test and evaluated. The results are indicated in the following table:

The activity of the compound under investigation was expressed by a fraction in which the numerator gives in percentage the average size of the tumor in a test group compared with the average size of the tumor in an untreated control group, which latter was taken as 100%. The denominator shows, in percentage, the average survival time of the treated animals compared with the average survival time of an untreated control group, which was taken as 100%. The test results show a substantially therapeutic cancerostatic action of the investigated compound in the case of sarcoma S 180, adenocarcinoma of the mammary gland HK, of the Ehrlich-ascitescarcinoma ATE and the Yoshida-ascitessarcoma Y.

The lactones of the present invention are preferably made by condensing a mucohalo acid of the formula

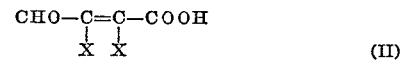
(II)

wherein X is bromine or chlorine, with a substituted-benzene of the formula

(III)

wherein $R_1$, $R_2$ and $R_3$ have the same meaning as given above in the case of Formula I. This condensation is preferably carried out in the presence of anhydrous zinc chloride or a mixture of anhydrous zinc chloride with phosphorus pentoxide at a temperature between 60 and 85° C. and preferably between 75 and 80° C. The substantially anhydrous zinc chloride should contain at most 5% water and is used in an amount by weight half of that or equal to that of the mucohalogenic acid of Formula II. If desired, the zinc chloride may be mixed with 5 to 20% phosphorus pentoxide. The use of these agents in the indicated condensation reaction is substantially superior to the prior art reactions which were carried out with polyphosphoric acid. The comparatively cumbersome requirement to have available a large amount of the polyphosphorus acid is avoided. The volume of the reaction mixture thus becomes smaller and the yield increases and the reaction is more easily reproducible. The starting products and the reaction product are subject to a smaller risk of decomposition. In addition, it is possible to form certain derivatives, for instance, γ-4-hydroxy-2-methoxyphenyl-α,β-dibromocrotonic acid lactone, which could not be made when using polyphosphoric acid as the condensation agent.

The optimum time of reaction depends on the character of the substituted benzene of Formula III. It can vary between 15 minutes and 8 hours, the prolongation of the reaction does not ordinarily have a perceptible effect on the yield in view of the non-deleterious nature of the condensation agent.

The isolation of the lactones from the reaction mixture is very simple. It can, for instance, be effected by the distribution of the product between chloroform and water, evaporation of the organic portion up to dryness, and purification of the residue by recrystallization from a suitable solvent or by chromatography over a silica gel column and subsequent recrystallization of the product obtained by means of an organic solvent.

| Dosage, mg./kg. per diem | Total | S 180 | HK | ATE | S 37 | Kr 2 | $6C_3HED$ | Y |
|---|---|---|---|---|---|---|---|---|
| 50 | 600 | | 89/113 | | | | | |
| 100 | 500 | | | 79/122 | 87/105 | 96/104 | /115 | /121 |
| 100 | 500 | | | | | | | /222 |
| I.p.: | | | | | | | | |
| 100 | 1,200 | 82/129 | 88/123 | | | | | |
| 200 | 1,000 | | | 69/117 | 81/88 | 109/100 | /103 | /120 |
| 200 | 2,400 | 89/115 | 88/103 | | | | | |
| 300 | 1,500 | | | 54/117 | | | | |

The following examples will illustrate the making of the lactones without any intention of limitation.

EXAMPLE I
γ-4-n-hexyloxyphenyl-α,β-dibromo-Δ^(α,β)-crotonic acid lactone

A mixture of 25.8 g. of mucobromic acid, 13.6 g. anhydrous zinc chloride, 1.36 g. phosphorus pentoxide and 17.8 g. n-hexylphenylether is heated upon exclusion of the humidity of the air and upon stirring for 5 hours in a bath maintained at 75–80° C. After cooling down of the molten mixture to about 40° C., 125 ml. of chloroform and 50 ml. of water having a temperature of about 30° C. are added, and the resulting mixture is subjected to thorough stirring. The chloroform layer is separated and subjected to repeated shaking with water and drying over anhydrous sodium sulfate. The solvent is removed by distillation after filtration. There are obtained 36.1 g. (86%) of a viscous crude product which furnishes the recrystallization material (methanol) after chromatography over a silica gel column (using benzene as eluent) in a yield of 34.4 g. (82%) and has a melting-point of 56–58° C.

EXAMPLE II
γ-4-hydroxy-2-methoxyphenyl-α,β-dibromo-Δ^(α,β)-crotonic acid lactone A mixture of 25.8 g. mucobromic acid, 12.4 g. resorcinolmonomethylether and 13.6 g. anhydrous zinc chloride are heated upon exclusion of air humidity and stirring for 3 hours in a bath that is maintained at 75–80° C. After treating the reaction mixture as in the preceding example but without chromatography, a crude product is obtained in a yield of 28.7 g. (79%). After recrystallization from methanol, the pure material is found to have a melting-point of between 155–156° C.

EXAMPLE III
γ-4-n-pentyloxyphenyl-α,β-dichloro-Δ^(α,β)-crotonic acid lactone By using 16.9 g. mucochloric acid, 16.4 g. n-pentylphenylether, 13.6 g. anhydrous zinc chloride and 1.36 g. phosphorus pentoxide in a procedure as indicated in the preceding examples, there is obtained the product as stated in the heading of this example, at a yield of 28.6 g. (91%). Its melting-point after recrystallization from methanol is 58–59° C.

EXAMPLES IV-X

In the same manner, using exactly the same mol relationship of the several reaction components and the same amounts of anhydrous zinc chloride and phosphorus pentoxide, yields from 80–95% of the following compositions were obtained:

(4) γ-4-ethoxyphenyl-α,β-dibromo-Δ^(α,β)-crotonic acid lactone, M.P. 96–97° C. (methanol)
(5) γ-4-propyloxyphenyl-α,β-dibromo-Δ^(α,β)-crotonic acid lactone, M.P. 57–58° C. (methanol)
(6) γ-4-n-butoxyphenyl-α,β-dibromo-Δ^(α,β)-crotonic acid lactone, M.P. 74–75° C. (methanol)
(7) γ-4-n-pentyloxyphenyl-α,β-dibromo-Δ^(α,β)-crotonic acid lactone, M.P. 82–84° C. (methanol)
(8) γ-2,4-dimethoxyphenyl-α,β-dibromo-Δ^(α,β)-crotonic acid lactone, M.P. 112–114° C. (methanol)
(9) γ-2,3,4-trimethoxyphenyl-α,β-dibromo-Δ^(α,β)-crotonic acid lactone, M.P. 117–119° C. (methanol)
(10) γ-2,4,6-trimethoxyphenyl-α,β-dibromo-Δ^(α,β)-crotonic acid lactone, M.P. 176–178° C. (methanol)

(II) The hydrolysis products

The lactones previously described can easily be hydrolyzed to form halogenoacrylic acids of the following formula:

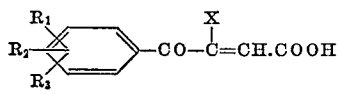

(IV)

wherein X is chlorine or bromine, $R_1$ is hydrogen, or alkoxy having 1 to 6 carbon atoms, $R_2$ is hydrogen or hydroxy or alkoxy having 1 to 6 carbon atoms, and $R_3$ is alkoxy having 1 to 6 carbon atoms, with the proviso that when $R_1$ and $R_2$ are both hydrogen, $R_3$ shall be alkoxy having 2 to 6 carbon atoms.

The halogenoacrylic acids defined have been found to possess a therapeutic action on animals with transplantable tumors in the case of parenteral administration. This action was with undesired side effects.

It was furthermore found that, for instance, the β-4-n-pentyloxybenzoyl-β-bromoacrylic acid was effective therapeutically also after peroral administration. This is a great advantage over the previously known β-4-methoxybenzoyl-β-bromoacrylic acid, which could be used only parenterally in the form of its sodium salts.

The halogenoacrylic acids can be obtained by hydrolysis of the previously described crotonic acid lactones of the formula:

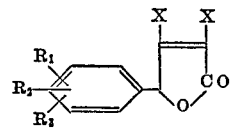

(V)

wherein X, $R_1$, $R_2$ and $R_3$ have the same meaning as in Formula IV, with a mixture of water and a water-miscible solvent, preferably dioxane, in the presence of zinc oxide and at the boiling temperature of the reaction mixture.

The amount of zinc oxide used for the hydrolysis is preferably from 1 to 4 mols relative to 1 mol of the lactone used as starting product.

Under the stated conditions, the hydrolysis proceeds with very good yields, in some cases almost quantitatively. The zinc salt of the β-aroyl-β-halogenoacrylic acid is substantially more stable compared, for instance, with the magnesium or sodium salt, and is not subject to decomposition during the reaction. The hydrogen halide that is formed during the hydrolysis of the lactone is bound in the form of the corresponding zinc halide. The use of zinc oxide thus permits the production of the desired acids with a high yield, usually above 90%, and at an almost analytical degree of purity, particularly because of the high stability of the zinc salt formed and the small possibility of deleterious action on the salt.

The β-aroyl-halogenoacrylic acids of the Formula IV can, for instance, be isolated by subjecting the reaction mixture after completion of the hydrolysis to evaporation to dryness under reduced pressure, dissolving the residue in water upon addition of sodium bicarbonate, whereupon the desired acid is liberated from the solution of its sodium salt by acidifying it with hydrogen chloride. It is also possible to proceed in the manner that the residue is distributed between dilute hydrochloric acid and chloroform, whereupon the chloroform extract is evaporated to dryness and the residue is purified by crystallization.

EXAMPLE XI

A solution of 22.2 g. β-4-ethoxybenzoyl-α,β-dibromo-Δ^(α,β)-crotonic acid lactone in 20 ml. dioxane is added dropwise to a boiling mixture of 240 ml. water and dioxane (in the ratio 1:1) and 5 g. zinc oxide. The addition is effected within 20 minutes and at a speed sufficient to keep the reaction mixture continuously at the boiling-point. After permitting the mixture to boil for another 75 minutes, the solvent is removed from the mixture by distillation at 40° C. and 14 torr and the residue is extracted for one hour with a warm solution (30–35° C.) of 24 g. sodium bicarbonate in 240 ml. water. The solution obtained of the β-4-ethoxybenzoyl-β-bromoacrylic acid sodium salt is acidified after filtration with conc. sulfuric acid and upon vigorous stirring to obtain a pH between 2 and 3. The acid that separates out is removed by suction after cooling to 5° C. and is dried in air at room temperature. The yield after recrystallization from benzene is 17.2 g. (94%), melting-point between 149–150° C.

The reaction mixture is preferably treated after removal of the volatile portions by distillation in a manner whereby the residue is shaken with hydrochloric acid and chloroform into which the liberated β-4-ethoxybenzoyl-β-bromoacrylic acid passes almost quantitatively.

EXAMPLES XII–XX

In the same manner as in the preceding example, using the same mol ratios of reaction products and the same general reaction medium, the following compositions were obtained in a yield between 80–90%:

(12) β-4-n-propoxybenzoyl-β-bromoacrylic acid, M.P. 118–119° C. (benzene)
(13) β-4-n-butoxybenzoyl-β-bromoacrylic acid, M.P. 122–123° C. (benzene-hexane)
(14) β-4-n-pentyloxybenzoyl-β-bromoacrylic acid, M.P. 103–104° C. (benzene-heptane)
(15) β-4-hexyloxybenzoyl-β-bromoacrylic acid, M.P. 98–99° C. (benzene-hexane)
(16) β-4-n-pentyloxybenzoyl-β-chromoacrylic acid, M.P. 94–95° C. (benzene)
(17) β-2,4-dimethoxybenzoyl-β-bromoacrylic acid, M.P. 133–135° C. (benzene)
(18) β-2,3,4-trimethoxybenzoyl-β-bromoacrylic acid, M.P. 120–121° C. (benzene)
(19) β-2,4,6-trimethoxybenzoyl-β-bromoacrylic acid, M.P. 156–157° C. (benzene)
(20) β-2,3,4-trimethoxybenzoyl-β-chloroacrylic acid, M.P. 114–115° C. (methanol)

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be protected by Letters Patent is set forth in the appended claim.

We claim:

1. β-4-n-pentyloxybenzoyl-β-bromoacrylic acid.

References Cited

UNITED STATES PATENTS 3,105,850  10/1963  Semonsky _____ 280—521 R

OTHER REFERENCES

Semonsky, Chem. Abst. 59 3822e (1963).
Arora et al., Canad. J. Chem. 45 (1), 67–73 (1967).
C.A. 57 14986 (1962), Semonsky et al. (II).

LORRAINE A. WEINBERGER, Primary Examiner

J. F. TERAPANE, Assistant Examiner

U.S. Cl. X.R.

260—343.6; 424—279, 317